DIGITAL FREQUENCY AND PHASE DISCRIMINATOR

Filed Dec. 19, 1963

Robert J. McCurdy,
INVENTOR.
BY Harry M. Saragovitz
Edward J. Kelly
Herbert Berl
Jack W. Voigt

United States Patent Office 3,391,343

Patented July 2, 1968

3,391,343

DIGITAL FREQUENCY AND PHASE DISCRIMINATOR

Robert J. McCurdy, Riverton, N.J., assignor, by mesne assignments, to the United States of America as represented by the Secretary of the Army

Filed Dec. 19, 1963, Ser. No. 331,978

8 Claims. (Cl. 328—133)

ABSTRACT OF THE DISCLOSURE

A frequency and phase discriminator circuit which has a D.C. output at all times. A forward-backward counter which counts forward in response to a first input signal and backwards in response to a second input signal. An output of this counter is taken only from an output of a last binary stage in the counter.

In the conventional phase detector arrangement the output error drives a reactance device which synchronizes a controlled oscillator. The controlled frequency output of the oscillator is fed back into the detector and the controlled frequency is locked in frequency and phase with a reference frequency. In this arrangement the error signal is only D.C. when the frequencies are equal. When the frequencies are unequal, as at turn on, the error will be an A.C. signal with a frequency equal to the difference frequency. If the loop bandwith is not sufficient to pass this frequency the loop will never pull in. An auxiliary frequency loop is sometimes used to bring the controlled oscillator within the pull-in range of the phase discriminator. If this pull-in range is small, the design of the auxiliary loop becomes very difficult. A phase detector has been devised, which constitutes my invention, that has a D.C. output at all times, whether the error be due to a phase difference or a frequency difference. Thus, the auxiliary loop is not required.

It is therefore an object of this invention to provide a phase detector which has a D.C. output at all times.

Another object of this invention is to provide an unlimited phase lock pull-in range in a closed loop.

A further object of this invention is to provide a discriminator which detects both phase and frequency differences.

According to the present invention, the foregoing objects are attained by a device which compares two pulse trains and generates an error voltage when a frequency or phase difference exists. This is accomplished by a digital counter which counts forward in response to one of the inputs, and counts backward in response to the other. The accumulated counts indicate the frequency error. When no frequency error exists, the counter will alternately step forward and backward, producing a square wave output. The symmetry of the square wave indicates the phase error.

The above and other features of the invention will be described in the following detailed description taken in conjunction with the drawings, in which.

Figure 1:
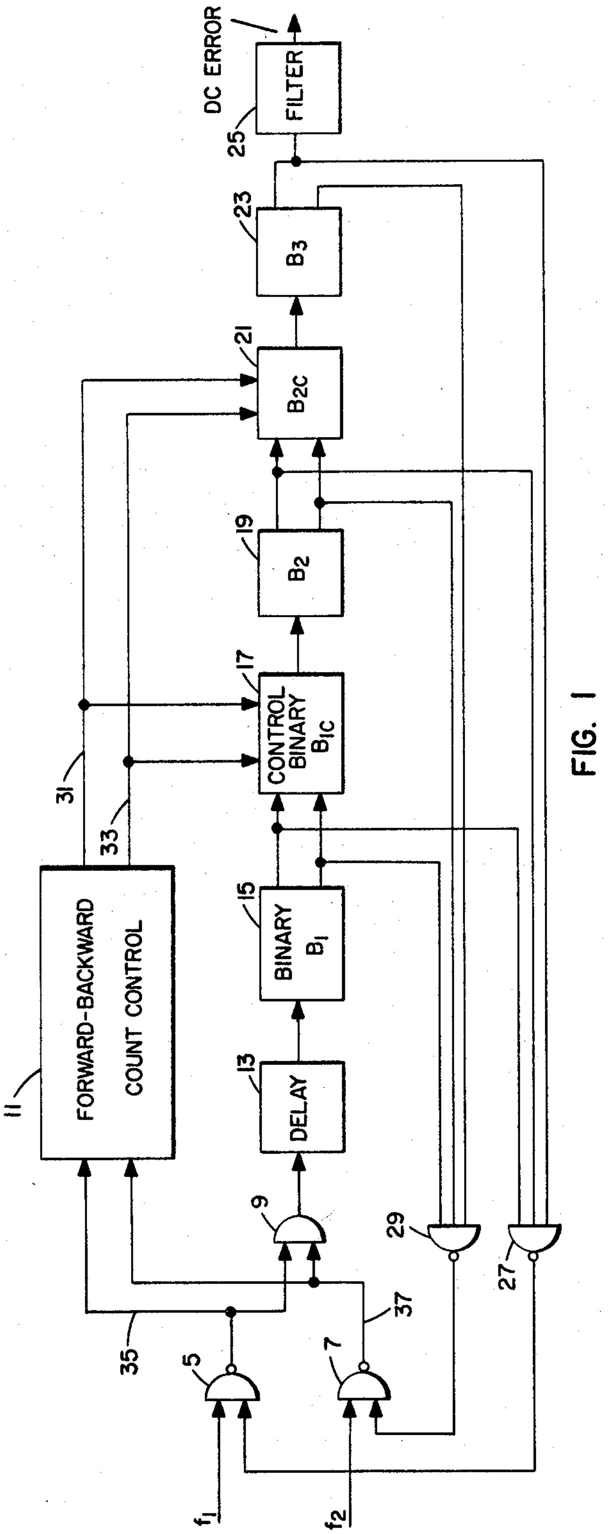
FIGURE 1 is a block diagram according to the present invention.

As shown in FIGURE 1 a forward-backward (bistable multivibrator) count controller 11 is connected to two control binaries 17 and 21 by means of leads 31 and 33. The signals $f_1$ and $f_2$ are fed into signal inhibitor circuits 5 and 7 respectively, along with feedback loops from the control binaries 15, 19, 23 being reduced to two signals by means of inhibitor circuits 27 and 29. The outputs of inhibitor circuits 5 and 7 are connected to controller 11 and to the OR gate circuit 9 by means of leads 35 and 37. The output of OR gate circuit 9 is fed into a delay circuit 13 whose output is connected to the first binary counter 15. A filter circuit 25 is connected to the output of binary 23 for extracting the D.C. error output.

The arrangement operates as follows: Assume a pulse input at $f_1$. This will set the forward-backward count controller 11 in the forward state. This, through the count control binaries 17 and 21, connects the three counter stages as a forward counter. The input pulse is delayed by delay circuit 13 to allow time for this switching and then advances the counter one count forward. Subsequent $f_1$ pulses will continue to advance the counter forward. A pulse input at $f_2$ will cause the counter to be connected as a backward counter, and will advance the counter one count backward. When the forward count reaches 7 (binary number 111), the forward pulses are inhibited by inhibitor 27. This must be done to prevent the next forward pulse from giving 000. If this were allowed, the counter would continue to recycle and would give an A.C. output, which is undesirable as stated above. Likewise, the backward count is inhibited by inhibitor 29 to prevent recycling when the backward count reaches zero (binary number 000).

The gamut of binary numbers that the counter can count is listed below.

| Count | Binary | | | |
|---|---|---|---|---|
| | $B_3$ | $B_2$ | $B_1$ | |
| 0 | 0 | 0 | 0 | } $f_1<f_2$ |
| 1 | 0 | 0 | 1 | |
| 2 | 0 | 1 | 0 | |
| 3 | 0 | 1 | 1 | } $f_1=f_2$ |
| 4 | 1 | 0 | 0 | |
| 5 | 1 | 0 | 1 | |
| 6 | 1 | 1 | 0 | } $f_1>f_2$ |
| 7 | 1 | 1 | 1 | |

Figure 2:
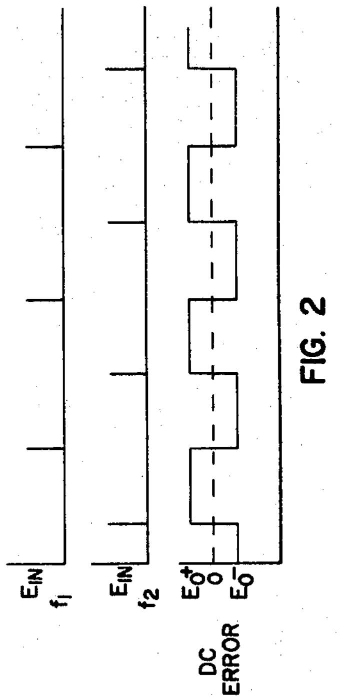
FIGURE 2 is a graph of a symmetrical output square wave indicative of a stable condition of both input signal frequencies ($f_1$ and $f_2$) being equal.

From this it can be seen that the output of $B_3$ will be 0 for $f_1<f_2$ and 1 for $f_1>f_2$, and will switch alternately between 0 and 1 when the loop has stabilized at $f_1=f_2$. The waveforms for the stable condition are shown in FIGURE 2. It can be seen from FIGURE 2 that the average D.C. from $B_3$ will be zero for the phase relationship shown. If the phase should change, the square wave will become unsymmetrical, and a net D.C. error voltage will result.

With suitable digital logic, the three conditions shown above can be used to give a visual indication or can be used to control the mode switching of a system.

Depending on the application, some simplifications can be made. For example, if the indications referred to in the preceding paragraph are not required, $B_3$ and its control binary $B_{2c}$ can be eliminated, and the output of $B_2$ can be used as the error voltage source. The counter range would then be 0 to 3 rather than 0 to 7.

It is the intention of the inventor not to be limited by the detailed description of the device in the foregoing specification but to be awarded the full breadth of his discovery as defined in the subjoined claims.

What is claimed is:

1. A frequency and phase discriminator circuit having two pulse train inputs comprising:

(a) a forward-backward digital counter having a plurality of stages for counting forward in response to one of said inputs, and counting backward in response to the other of said inputs, (b) a signal inhibitor means connected between the outputs of said counter stages and the inputs of said counter, and (c) an output means connected to the last stage of said counter whereby a substantially D.C. error signal is detectable.

2. A digital frequency and phase discriminator circuit for producing a direct current output signal proportioned to the difference in phase or frequency of different signals comprising:

(a) an input circuit means having as its input a plurality of signals which are to be discriminated, (b) said input circuit means having first, second and third output terminals, (c) a forward-backward signal control means having first and second input terminals connected to said second and third output terminals of said input means, (d) a plurality of count control means connected to the output of said forward-backward control means, (e) a plurality of counting means connected respectively to inputs and outputs of said control means, whereby a series arrangement is developed beginning with a counting means followed by a control means and ending with a counting means, (f) a time delay circuit connected between said first output terminal of said input means and an input of said counting means being first in said series arrangement, (g) a signal inhibitor means connected between the output of each of said counting means and the input of said input circuit means, and (h) an output means connected to the output of said counting means being last in said series arrangement for providing a substantially D.C. output signal.

3. A digital frequency and phase discriminator as in claim 2 wherein said input circuit means is an inhibitor circuit.

4. A device as in claim 3 wherein said inhibitor circuit consists of two inhibitors and an OR gate, said two inhibitors having inputs which accept the input signals of said circuit, and said OR gate being connected to outputs of said inhibitors.

5. A circuit as set forth in claim 3 wherein said forward-backward signal control means is a bistable multivibrator.

6. A circuit as set forth in claim 5 wherein said count control means is a switch having two stable states.

7. A circuit as set forth in claim 6 wherein said counting means is a bistable multivibrator.

8. A circuit as set forth claim 7 wherein said output means contains a filter circuit.

References Cited

UNITED STATES PATENTS

| | | | |
|---|---|---|---|
| 2,880,934 | 4/1959 | Bensky et al. | 328—44 |
| 2,970,759 | 2/1961 | Lanning | 328—44 |
| 3,187,262 | 6/1965 | Crane | 307—88.5 |
| 3,192,478 | 6/1965 | Metz | 307—88.5 |
| 3,206,665 | 9/1965 | Burlingham | 328—44 |
| 3,251,981 | 5/1966 | Gaudette et al. | 328—44 |

ARTHUR GAUSS, *Primary Examiner.*

J. ZAZWORSKY, *Assistant Examiner.*